(12) United States Patent
Schulte et al.

(10) Patent No.: US 7,602,502 B2
(45) Date of Patent: Oct. 13, 2009

(54) METHODS OF TESTING AND MANUFACTURING OPTICAL ELEMENTS

(75) Inventors: Stefan Schulte, Aalen-Westhausen (DE); Ulrich Andiel, Ulm (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 12/216,106

(22) Filed: Jun. 30, 2008

(65) Prior Publication Data

US 2008/0316500 A1    Dec. 25, 2008

Related U.S. Application Data

(63) Continuation of application No. 11/783,684, filed on Apr. 11, 2007, now abandoned.

(51) Int. Cl.
*G01B 11/02* (2006.01)
(52) U.S. Cl. .................................... 356/512
(58) Field of Classification Search .......... 356/511–514
See application file for complete search history.

(56) References Cited

U.S. PATENT DOCUMENTS

| | | | |
|---|---|---|---|
| 4,340,306 A | 7/1982 | Balasubramanian | |
| 4,732,483 A | 3/1988 | Biegen | |
| 5,473,434 A | 12/1995 | de Groot | |
| 5,488,477 A | 1/1996 | de Groot | |
| 5,777,741 A | 7/1998 | Deck | |
| 6,714,308 B2* | 3/2004 | Evans et al. | 356/513 |
| 6,781,700 B2* | 8/2004 | Kuchel | 356/513 |
| 2003/0184762 A1 | 10/2003 | Kim et al. | |

FOREIGN PATENT DOCUMENTS

WO    WO2005/114101    12/2005

OTHER PUBLICATIONS

M. Beyerlin et al. "Dual-wave-front computer generated holograms for quasi-absolute testing of aspherics", Applied Optics, vol. 41, No. 13, May 1, 2002, pp. 2440-2447.

Daniel Malacara, "Optical Shop Testing", $2^{nd}$ Edition, John Wiley & Sons, Inc., 1992, New York, chapters 15.1 (pp. 599-600), 15.2 (pp. 600-603) and 15.3 (pp. 603-612).

J. Hetzler et al., Unpublished U.S. Appl. No. 12/197,035 entitled "Optical System, Method of Manufacturing an Optical System and Method of Manufacturing an Optical Element," filed Aug. 22, 2008, 70 pages (continuation of U.S. Appl. No. 11/233,435, J. Hetzler et al., filed Sep. 21, 2005).

* cited by examiner

*Primary Examiner*—Tarifur Chowdhury
*Assistant Examiner*—Jonathon D Cook
(74) *Attorney, Agent, or Firm*—Townsend and Townsend and Crew LLP

(57) ABSTRACT

A method of manufacturing an optical element having an optical surface of a non-rotationally symmetric shape is described. Measuring light is generated using an interferometer optics, wherein the interferometer optics has at least one diffractive component having a grating. The optical surface is positioned at a first position relative to the diffractive component, wherein first measuring light diffracted at the diffractive component is incident on the optical surface at plural locations thereof, and at least one first interference pattern generated from first measuring light reflected from the optical surface is detected. The optical surface is positioned at a second position relative to the at least one diffractive component, wherein second measuring light diffracted at the diffractive component is incident on the optical surface at plural locations thereof, and at least one second interference pattern generated from second measuring light reflected from the optical surface is detected.

12 Claims, 10 Drawing Sheets

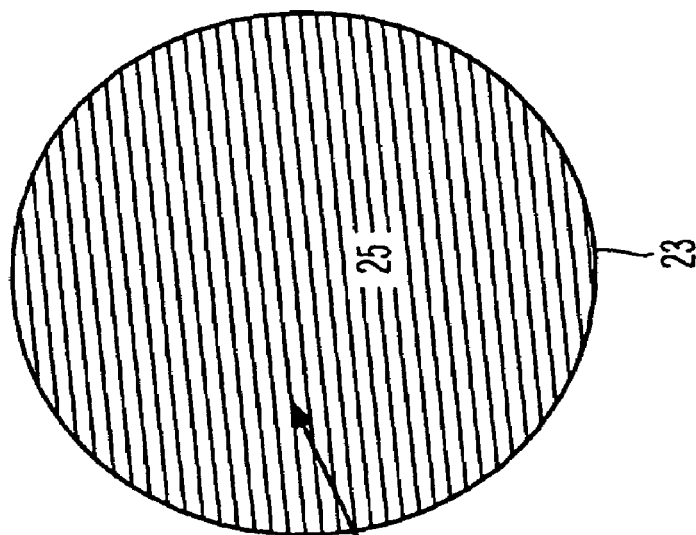
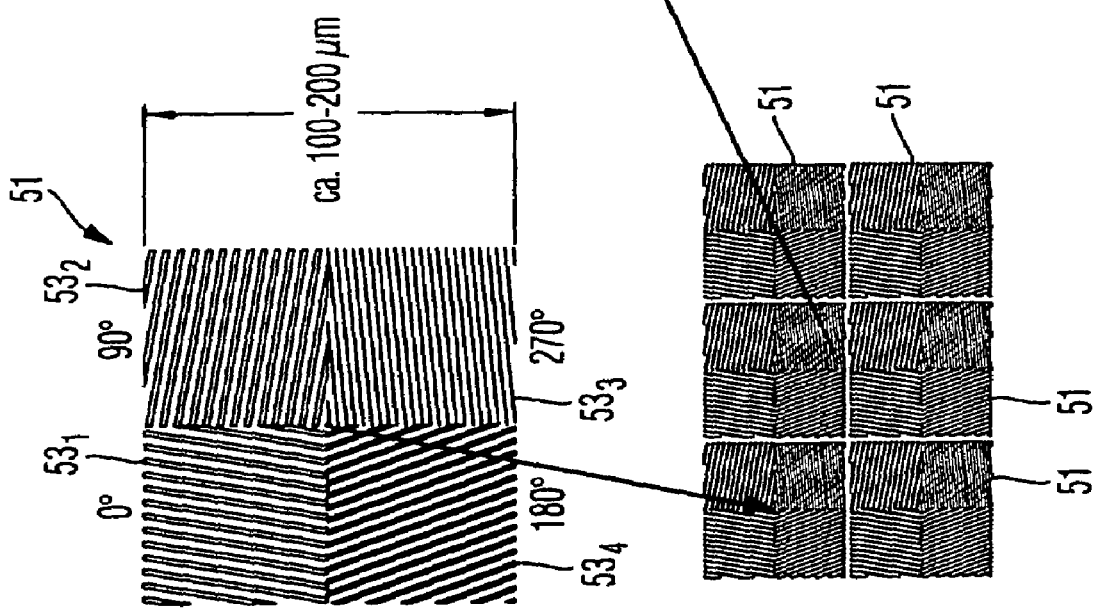
Fig. 2a
Fig. 2b
Fig. 2c

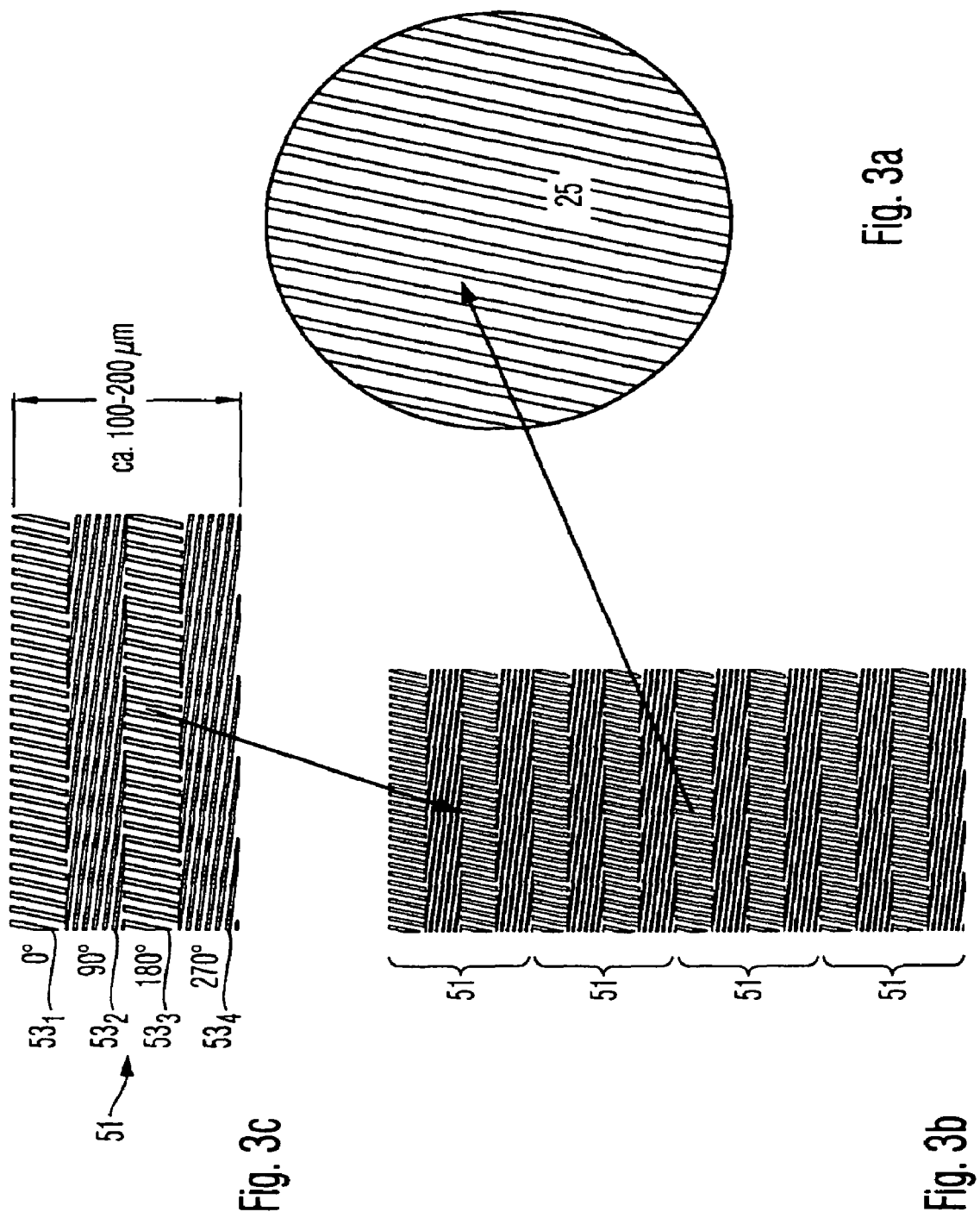

METHODS OF TESTING AND MANUFACTURING OPTICAL ELEMENTS

CROSS REFERENCE TO RELATED APPLICATION

This application is a continuation of U.S. patent application Ser. No. 11/783,684, filed on Apr. 11, 2007 now abandoned the entire contents of which are incorporated herein by reference.

BACKGROUND OF THE INVENTION

1. Field of the Invention

The present invention relates to methods of testing and manufacturing optical elements.

2. Brief Description of Related Art

The optical element having the optical surface is, for example, an optical component such as an optical lens or an optical mirror used in optical systems, such as telescopes used in astronomy, and systems used for imaging structures, such as structures formed on a mask or reticle, onto a radiation sensitive substrate, such as a resist, in a lithographic method. The success of such an optical system is substantially determined by the accuracy with which the optical surface can be processed or manufactured to have a target shape determined by a designer of the optical system. In such a manufacture it is necessary to compare the shape of the processed optical surface with its target shape, and to determine differences between the processed and target surfaces. The optical surface may then be further processed at those portions where differences between the processed and target surfaces exceed e.g. predefined thresholds.

Interferometric apparatuses are commonly used for high precision measurements of optical surfaces. Examples of such apparatus are disclosed in U.S. Pat. Nos. 4,732,483, 4,340,306, 5,473,434, 5,777,741, 5,488,477. The entire contents of these documents are incorporated herein by reference.

The conventional interferometer apparatus for measuring an optical surface typically includes a source of coherent light and an interferometer optics for generating a beam of measuring light incident on the surface to be tested, such that wavefronts of the measuring light have, at a position of the surface to be tested, a same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations of the shape of the surface under test and its target shape are determined from a resulting interference pattern.

The interferometer optics for generating the beam of measuring light incident on the surface to be tested may comprise one of more refractive optical elements, such as lenses. It is also known to use a diffractive component such as a hologram in an interferometer optics. Background information and examples of using holograms in interferometric measurements are illustrated in Chapters 15.1, 15.2, and 15.3 of the text book of Daniel Malacara, "Optical Shop Testing", $2^{nd}$ Edition, John Wiley & Sons, Inc. 1992, New York. The hologram may be a real hologram generated by exposing a suitable material, such as a photographic plate, with interfering light beams, or a synthetic hologram, such as a computer generated hologram (CGH) generated by simulating the interferometer set up by a suitable computational method, such as ray tracing, and producing the hologram by manufacturing steps using a pen plotter and optical reduction, lithographic steps, laser beam recorders, electron beam recorders and others.

It has been found that the conventional methods of testing and manufacturing optical surfaces using diffractive components are limited with respect to applications where optical surfaces of different and/or more complex shapes have to be tested.

SUMMARY OF THE INVENTION

The present invention has been accomplished taking the above problems into consideration.

Embodiments of the present invention provide methods of manufacturing optical elements having an optical surface of a non-rotationally symmetric shape, wherein measuring light is generated using an interferometer optics having at least one diffractive component, wherein the diffractive component provides at least two phase functions. Each of the phase functions defines wavefronts of measuring light diffracted at the grating. At least two different types of wavefronts are generated due to the at least two different phase functions provided by the grating. The at least two phase functions are designed such that the generated wavefronts correspond to a target shape of the non-rotationally symmetric optical surface in at least two different corresponding rotations about a suitably chosen axis of rotation. Thus, the method may further comprise positioning the optical surface at a first rotational position about an axis of rotation, wherein first measuring light diffracted at the diffractive component according to the first phase function is substantially orthogonally incident on the optical surface at plural locations thereof, and detecting at least one first interference pattern generated from first measuring light reflected from the optical surface, while second measuring light diffracted at the diffractive component according to the second phase function does substantially not contribute to the detected at least one first interference pattern; positioning the optical surface at a second rotational position about the axis of rotation, wherein the second measuring light diffracted at the diffractive component according to the second phase function is substantially orthogonally incident on the optical surface at plural locations thereof, and detecting at least one second interference pattern generated from second measuring light reflected from the optical surface, while the first measuring light diffracted at the diffractive component according to the first phase function does substantially not contribute to the detected at least one second interference pattern.

As mentioned above, the interference patterns are generated from measuring light reflected from the optical surface. For this purpose, the measuring light is substantially orthogonally incident on the optical surface at plural locations thereof. In the context of the present application, the term "substantially orthogonally incident" does not necessarily mean that the measuring light is exactly orthogonally incident on the optical surface at each location thereof. In practice, an angle of incidence of the measuring light on the optical surface may deviate from exactly 90° by an amount which is determined by practical considerations, wherein light rays which deviate from orthogonal incidence by a large amount will not contribute to the generated interference pattern. For this purpose, an interferometer arrangement may comprise a suitable element for selecting light rays contributing to the interference pattern. For example, such element can be an aperture disposed in the beam path of the interferometer apparatus, wherein the aperture receives light rays which are reflected from the optical surface and incident on the optical surface under a relatively large range of angles of incidence, wherein the aperture then allows only a subset of these light rays to traverse the aperture and contribute to the interference pattern. Those light rays which are allowed to contribute to the interference pattern are incident on the optical surface under a relatively narrow range of angles (e.g., within 5 degrees of the perpendicular, 1 degree of the perpendicular, 0.5 degree of the perpendicular, 0.1 degree of the perpendicular, or less) such that they fulfill the above requirement that they are substantially orthogonally incident on the optical surface. Similarly, the illustrated method involves use of a diffractive component providing at least two phase functions, wherein one phase function contributes to a given interference pattern, whereas the other phase function does substantially not contribute to this interference pattern. Again, this should not be interpreted to mean that the other phase function necessarily provides no contribution at all to the generated interference pattern. In practice, it may happen that some rays diffracted at the grating according to the other phase function are incident on the optical surface such that they are reflected from the optical surface under a suitable angle such that they are finally able to reach a detector for detection of the interference pattern. However, an amount of light diffracted according to the one phase function and reaching a detector is greater, for example more than 5 times greater or more than 10 times greater than the amount of light reaching the detector which was diffracted according to the other phase function.

It is therefore possible to measure the non-rotationally symmetric surface at plural different rotational positions and to perform an averaging of corresponding measuring results to increase a measuring accuracy.

According to an exemplary embodiment of the present invention, the grating comprises a plurality of regions of at least two different types, wherein regions of a same type provide one of the plural phase functions. According to a particular embodiment herein, the regions of the different types may be alternatingly distributed across a surface of the grating. Herein, the regions of the different types can be arranged according to a regular pattern and/or according to an irregular pattern.

According to an exemplary embodiment, the interference patterns are detected by a detector including a plurality of pixels, wherein an interferometer apparatus incorporating the at least one grating and the detector is further configured such that a surface of the grating is optically imaged onto the arrangement of pixels on the detector. The regions of the grating are further arranged such that lateral extensions of images of the regions formed on the arrangement of pixels are smaller than lateral extensions of individual pixels on the detector. Thus, at least some pixels of the detector receive light reflected from the optical surface to be tested in more than one, and in particular in all, of the rotational positions of the non-rotationally symmetric surface about the axis of rotation. The above mentioned imaging of the surface of the grating onto the arrangement of pixels on the detector has to be understood in the context of the present invention such that it not necessarily means an exact optical imaging wherein the surface of the grating is exactly located in an object plane of the interferometer optics and the surface of the detector is located exactly in an image plane corresponding to the object plane. Moreover, the term optically imaged as used above in the present application should mean that there is an optical correspondence between points located on the surface of the grating and points located on the surface of the detector, wherein it is possible that rays of measuring light originating from a point on the surface of the grating are incident on an extended region of the surface of the detector. This means that the imaging as used in the present invention is not necessarily a "sharp" imaging in the optical sense.

According to a further exemplary embodiment, the measuring light not contributing to the detected interference pattern at a respective rotational position of the optical surface to be tested is intercepted by a suitable body placed in a beam path of the measuring light. Such body may be provided by an aperture having a through-hole, wherein such aperture is fixedly mounted in a same position in the beam path of the measuring light irrespective of the rotational position of the optical surface.

According to a further embodiment, the invention provides a method of manufacturing at least two different optical elements using a same interferometer optics. Herein, the interferometer optics comprises at least one diffractive component having a grating, wherein the grating provides at least two phase functions, each adapted to generate measuring light having wavefronts corresponding to a respective optical surface to be tested. Accordingly, the method of manufacturing of the at least two optical elements having optical surfaces of different target shapes comprises: generating measuring light using an interferometer optics, wherein the interferometer optics comprises at least one diffractive component having a grating, wherein the grating provides at least a first and a second phase function, positioning a first optical surface in a beam path of the measuring light such that first measuring light diffracted at the diffractive component according to the first phase function is substantially orthogonally incident on the first optical surface, and detecting at least one first interference pattern generated from the first measuring light reflected from the first optical surface, while second measuring light diffracted at the diffractive component according to the second phase function does substantially not contribute to the detected at least one first interference pattern, and positioning a second optical surface in the beam path of the measuring light such that second measuring light diffracted at the diffractive component according to the second phase function is substantially orthogonally incident on the second optical surface and detecting at least one second interference pattern generated from second measuring light reflected from the second optical surface, while the first measuring light diffracted at the diffractive component according to the first phase function does substantially not contribute to the detected second interference pattern.

According to exemplary embodiments of the present invention, the at least two optical surfaces have an axis of rotational symmetry, and each of the two surfaces is measured at plural rotational positions about its axis of rotational symmetry, wherein measuring results of the measurements at the plural rotational positions can be combined by methods such as averaging to improve an accuracy of the measurement.

According to an exemplary embodiment herein, the grating is provided on a substrate, wherein the grating has a first portion provided in a first region of the substrate and providing the first phase function, wherein the grating has a second portion provided in a second region of the substrate and providing the second phase function, and wherein the first and second regions are disposed adjacent to each other on the substrate.

According to a particular embodiment herein, the measurement is performed using an interferometer apparatus comprising the interferometer optics and further comprising a detector for recording the interference patterns, wherein the interferometer apparatus is configured such that the grating is imaged onto a detector surface of the detector, and wherein none of the plural regions of the grating is imaged onto a complete surface of the detector. For example, amounts of the detection surface onto which a single region of the grating is imaged can be less than 80%, less than 70% or less than 60% of a total area of the detection surface. Thus, only a portion of the detector surface is used for recording interference patterns generated by a single one of the plural optical surfaces to be tested. This includes that only a portion of a respective optical surface reflects light contributing to the respective detected interference pattern, such that only a portion of the optical surface can be tested at the same time. Therefore, embodiments of the present invention include recording plural interference patterns corresponding to plural rotational positions of the respective optical surface about its axis of rotational symmetry, wherein measuring results of the measurements at the plural rotational positions are combined by numerical methods to provide a measuring result of the total surface of the respective optical surface.

According to exemplary embodiments of the present invention, a portion of the respective optical surface imaged onto the detector in an individual measurement includes a region about the axis of rotation of the optical element. This provides the advantage that the different portions of the optical surface measured at the plural rotational positions overlap and the region about the optical surface which allows to increase a measurement accuracy of the total optical surface.

According to an exemplary embodiment herein, this can be achieved by positioning the diffractive component at different positions relative to the detector, wherein each of the different positions corresponds to one of the plural different optical surfaces which are to be tested by this method.

The above illustrated embodiments provide methods for manufacturing optical elements. Exemplary embodiments herein, include processing of the optical surfaces based on the detected interference patterns. According to further embodiments herein, the processing of the optical surfaces comprises at least one of milling, grinding, loose abrasive grinding, polishing, ion beam figuring, magneto-rheological figuring, reactive ion beam etching and other suitable processings. Further, the processing may comprise a finishing of the optical surface. According to particular embodiments, the finishing may comprise applying a coating to the optical surface, wherein the coating may comprise a reflective coating, an anti-reflective coating and a protective coating.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

FIGS. 2a, 2b, 2c are schematic representations of a grating structure incorporated in an interferometer optics of the interferometer arrangement shown in FIGS. 1a and 1b;

FIGS. 3a, 3b, 3c are schematic representations of a further grating structure incorporated in an interferometer optics shown in FIGS. 1a and 1b;

DETAILED DESCRIPTION OF EXEMPLARY EMBODIMENTS

Figure 1A:
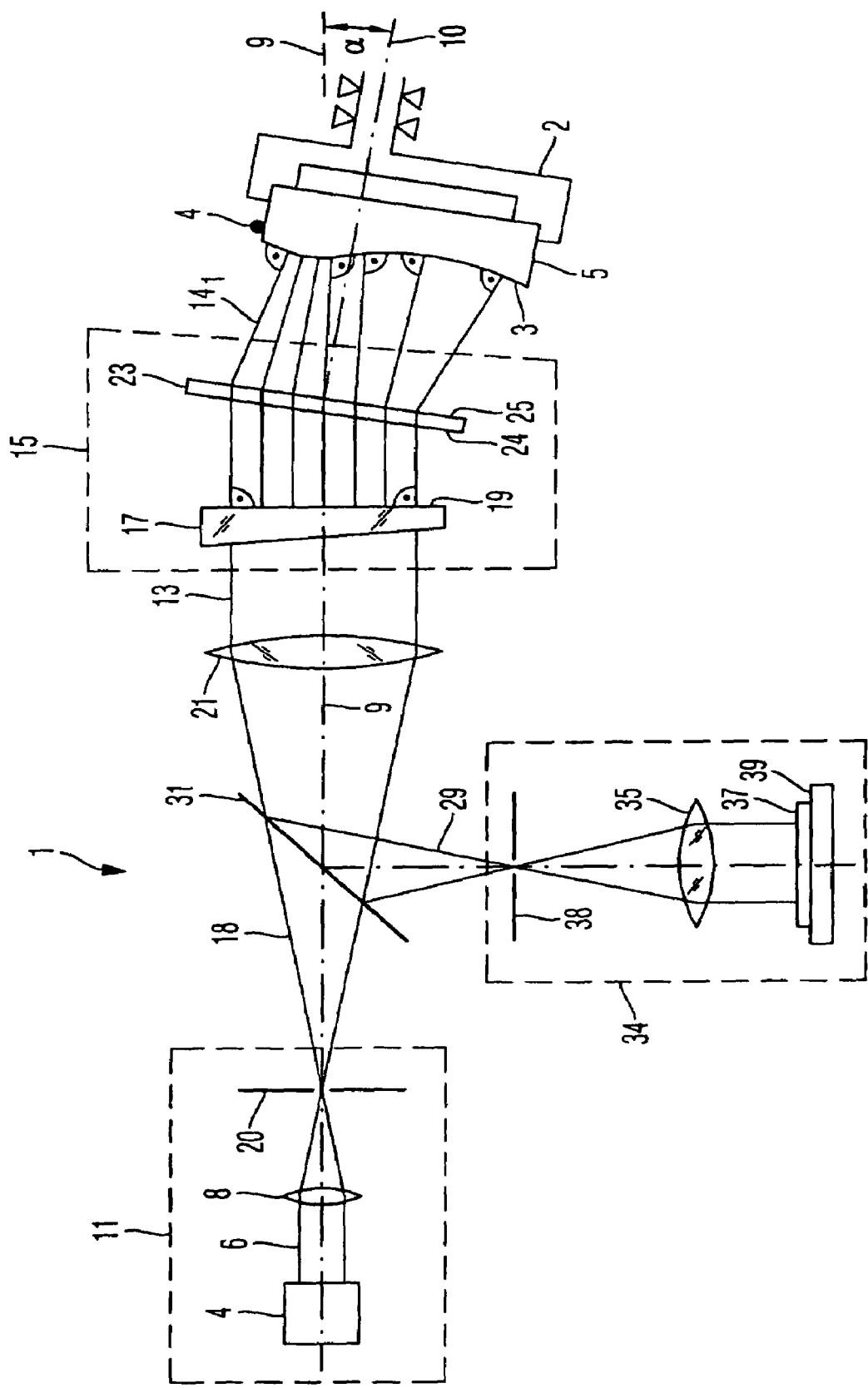
FIGS. 1a and 1b schematically illustrate an interferometer arrangement for testing an optical element according to an embodiment of the present invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1a is a schematic illustration of an interferometer arrangement according to an embodiment of the present invention.

The interferometer arrangement 1 comprises a light source 11 for generating a beam 14 of measuring light. The light source 11 comprises a helium neon laser 4 emitting a laser beam 6. Beam 6 is focused by a focusing lens 8 onto a pin hole aperture of a spatial filter 20 such that a diverging beam 18 of coherent light emerges from the pin hole. It is to be noted that other types of light source can be used in the present embodiment. For example, a suitable light source can also be provided by an end of a fiber, wherein a diverging beam of coherent measuring light is emitted from the fiber end. Wavefronts in diverging beam 18 are substantially spherical wavefronts. The diverging beam 18 is collimated by a lens or group of lenses 21 to form the parallel beam 13 of measuring light having substantially flat wavefronts. Beam 13 traverses an interferometer optics 15 which transforms and shapes a portion of the beam 13 of measuring light such that a beam 14 supplied by the interferometer optics 15 and incident on an optical surface 3 has wavefronts of a shape which corresponds to a target shape of optical surface 3 at each position thereof. Thus, if the optical surface 3 is machined such that its surface shape corresponds to the target shape, the light of beam 14 is orthogonally incident on the optical surface 3 at each location thereof. The light reflected from the optical surface 3 will then travel back substantially the same way as it was incident on the optical surface 3, traverse the interferometer optics 15, and a portion thereof will be reflected from a beam splitter 31 disposed in the portion of the beam 13 of measuring light where beam 13 is the parallel beam having the flat wavefronts. A beam 29 reflected from the beam splitter 31 is imaged onto a photo sensitive surface 37 of a camera chip 39 through a pinhole aperture 38 by an objective lens system 35 of a camera 34, such that the optical surface 3 is imaged onto the camera 39.

The interferometer optics 15 comprises a wedge shape substrate 17 having a flat surface 19 which is oriented transverse to the parallel beam 13 of measuring light having traversed substrate 17. Surface 19 forms a Fizeau surface of interferometer system 1 in that it reflects a portion of the beam 13 of measuring light. The reflected portion of the beam 13 of measuring light forms reference light for the interferometric method. The reference light reflected back from Fizeau surface 19 travels back a same path as it was incident on surface 19, and is thus superimposed with the measuring light reflected from optical surface 3. The reference light is also deflected by beam splitter 31 and imaged onto the photo sensitive surface 37 of camera 39, such that an interference pattern generated by superimposing the wavefronts reflected from the optical surface 3 and the wavefronts reflected back from Fizeau surface 19 may be detected by camera 39.

In the exemplary embodiment illustrated in FIG. 1, the Fizeau surface 19 is oriented orthogonal with respect to the beam of measuring light traversing the Fizeau surface. In practice, however, it is often preferable to orient the Fizeau surface slightly oblique relative to the beam of measuring light traversing the Fizeau surface such that an interference pattern having a number of interference fringes is generated in a situation when the object to be tested has a perfect target shape. A suitable number of interference fringes generated in this manner can amount to 250 to 1000 fringes, for example.

As mentioned above, the interferometer optics 15 is designed such that it transforms a portion of the entering beam 13 of measuring light having the parallel wavefronts into the beam 14 of measuring light having the wavefronts conforming with the surface 3 of the optical element 5 at the position of the optical surface 3. For this purpose, the interferometer optics 15 comprises a substrate 23 having two parallel flat surfaces wherein one surface 25 disposed opposite to the optical surface 3 carries a grating. The grating is a computer generated hologram (CGH) designed such that it diffracts the portion of the beam 13 having the flat wavefronts exactly such that the wavefronts in the beam 14 at the position of the optical surface 3 will have a shape which substantially corresponds to the target shape of the optical surface 3. Basically, portions of the grating may be generated by exposing a photographic plate to reference light and light reflected from an optical surface having a surface corresponding to the target shape to a high accuracy.

In the illustrated example, a structure of the grating is calculated by numerical methods, and techniques such as lithographic methods and electron beam writing are used to produce the calculated grating structures.

Background information with respect to gratings used in interferometry may be obtained from Chapter 15 of the above mentioned textbook of Daniel Malacara.

In the present embodiment, the optical element 5 to be manufactured comprises a surface 3 having a non-rotationally symmetric shape. It is a goal of the method according to the illustrated example to determine the shape of surface 3 using the interferometer apparatus 1, to calculate deviations between the determined surface shape and a target shape of surface 3, and to perform a suitable processing of the surface 3 to mechanically change the actual shape of surface 3 such that the deviations between its actual shape and the target shape are reduced such that the actual shape corresponds to its target shape to a sufficient accuracy determined by an application in which the optical element 5 will be used.

The target shape of surface 3 is non-rotationally symmetric which means that an axis of rotational symmetry does not exist for surface 3. Even if surface 3 would be part of a rotationally symmetric surface it is still possible that surface 3 by itself has a non-rotationally symmetric shape. The term non-rotationally symmetric as used in the present application depends on an accuracy with which the surface can be tested. In practice, it is very difficult to manufacture a surface which is exactly rotationally symmetric since even the best mechanical manufacturing methods and the best testing methods will not be able to produce a perfectly rotationally symmetric surface. Therefore, from a practical point of view, a surface is regarded as a rotationally symmetric surface if deviations from a perfectly rotationally symmetric shape are less than a given threshold or if it is not possible to determine such deviations in a situation when the existing deviations can not be determined with a measurement apparatus having a given limited accuracy. Therefore, the term non-rotationally symmetric as used in the present application means that a deviation of the surface from a rotationally symmetric shape can be determined and measured using the interferometer apparatus 1.

Conventional interferometer apparatuses are often used for testing rotationally symmetric surfaces wherein the surface is mounted relative to the interferometer apparatus such that it is possible to position the surface relative to the interferometer apparatus at plural rotational positions about an axis of rotational symmetry of the surface. It is then possible to measure the surface shape at plural rotational positions of the surface relative to the interferometer apparatus and to average the measuring results obtained from the individual measurements to determine the actual shape of the surface with a higher accuracy. It is apparent that such methods can not be used for non-rotationally symmetric surfaces.

FIG. 1a shows a mounting structure 2 for mounting the optical element 5 relative to the interferometer apparatus 1, wherein the mounting structure 2 is rotatable about an axis 10. In the schematic illustration of FIG. 1a, axis 10 about which the optical element 5 is rotatable is arranged under an angle α relative to an axis 9 of symmetry of components of the interferometer apparatus 1.

It is apparent that the surface shape of surface 3 is not rotationally symmetric. Curvatures and changes of curvatures of surface 3 are exaggerated in FIG. 1a for illustration purposes.

Figure 1B:
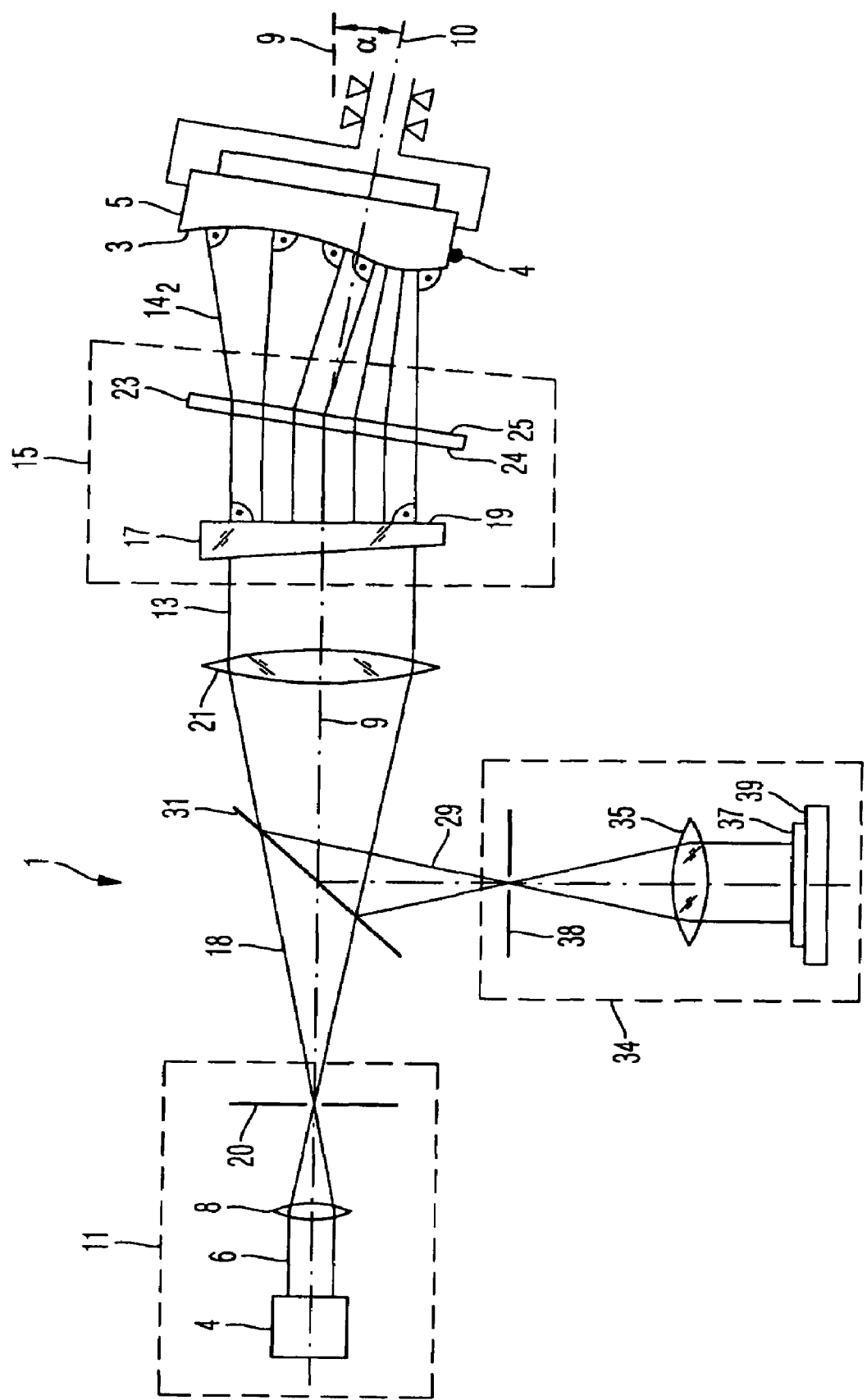

The optical element 5 can be rotated about axis 10 which is not an axis of rotational symmetry of surface 3 since surface 3 is not rotationally symmetric. FIGS. 1a and 1b illustrate two rotational positions of optical element 5 about axis 10. This is apparent by comparing the illustrated surface shapes of surface 3 in FIGS. 1a and 1b, and the two different rotational positions of optical element 5 are further represented by a marker 4 located at a peripheral surface of the optical element 5 and which is in an upper position in FIG. 1a and in a lower position in FIG. 1b. The measuring method illustrated in the present example includes performing one or more interferometric measurements of the surface 3 in the rotational position shown in FIG. 1a, rotating the optical element 5 about axis 10 by 180°, and performing one or more further interferometric measurements of the surface 3 rotated in the position as shown in FIG. 1b.

The grating 25 generates the measuring light 14 incident on the surface 3 by diffracting incident light of light beam 13. The grating 25 is configured such that it produces, by diffraction, at least two types of measuring light $14_1$ and $14_2$, wherein the portion $14_1$ shown in FIG. 1a is diffracted such that it is substantially orthogonally incident on surface 3 at substantially all locations thereof when the optical element 5 is in its first position about axis 10 as shown in FIG. 1a, and wherein the portion $14_2$ shown in FIG. 1b is substantially orthogonally incident on surface 3 at substantially all locations thereof when the optical element 5 is in its second rotational position about axis 10 as shown in FIG. 1b. The measuring light $14_1$, $14_2$ which is orthogonally incident on surface 3 is reflected back, diffracted at grating 25 again, traverses aperture 38 of the detector arrangement 34 and will contribute to an interference pattern generated on surface 37 of detector 39. The other light, i.e. that light which is not substantially orthogonally incident on surface 3 and which is the light 14$_2$ (not shown in FIG. 1a) when the optical element 5 is in its first rotational position, and which is measuring light 14$_2$ (not shown in FIG. 1b) when the optical element 5 is in its second rotational position about axis 10, is also reflected back from the optical surface 3 but under an angle deviating from a surface normal such that at least a portion of the reflected measuring light is again incident on the grating 25 but the grating 25 will not diffract this light exactly such that it will be able to traverse the aperture 38 to be incident on the detector 39. Thus, such other undesired measuring light will substantially not contribute to interference patterns formed on the detector with the desired measuring light which is substantially orthogonally incident on the optical surface 3 to be tested.

It is apparent from FIGS. 1a and 1b that a surface normal on the surface of grating 25 is oriented under an angle relative to a direction of the measuring light incident on the hologram. Further, the grating introduces a deflection of the incident light such that an average direction of the diffracted light is arranged under an angle relative to the average direction of the incident light, wherein the angle is of an amount which is comparable to the angle α between axis 9 and 10. Such average deflection is achieved by a type of grating which is referred to as carrier frequency hologram in the art and has a certain line density causing the deflection, wherein this line density is modulated to achieve the formation of wavefronts such that they conform with the target shape at locations on the optical surface to be tested. More details on using carrier frequency holograms in interferometric measurements can be taken from U.S. Pat. No. 7,061,626, the entire contents of which are incorporated herein by reference. In particular, it is possible to arrange a deflecting prism in a beam path of the measuring light between the Fizeau surface 19 and the grating 25 such that the average deflection caused by the hologram is compensated by such deflecting prism.

FIGS. 2a, 2b and 2c illustrate a structure of a grating which is capable of producing plural types of measuring light.

FIG. 2a is an elevational view of grating 25, and FIG. 2b is an enlarged representation of a portion of grating 25. The grating shown in FIG. 2b has plural segments 51 which are arranged in a rectangular pattern. FIG. 2c is a further enlarged representation of one single segment 51. It is apparent that the segment 51 is composed of four regions 53 in which grating forming structures, which are represented as alternating black and white stripes in FIG. 2c, are arranged according to substantially different patterns. Each of the four different regions 53 contributes to generating measuring light which is orthogonally incident on the surface to be tested in one of four different rotational positions. In particular, a region 53$_1$ arranged top left in segment 51 contributes to generating the desired measuring light when the optical element 5 is in a first rotational position. A region 53$_2$ located in the top right of segment 51 contributes to generating the desired measuring light when the optical element 5 is in a second rotational position oriented under an angle of 90° relative to the first rotational position, a region 53$_3$ located in the bottom right of segment 51 contributes to generating the desired measuring light when the optical element 5 is in a third rotational position oriented under an angle of 270 relative to the first rotational position, and a region 53$_4$ located in the bottom left of segment 51 contributes to generating the desired measuring light when the optical element 5 is in a fourth rotational position oriented under an angle of 180 relative to the first rotational position.

Thus, the grating 25 illustrated in FIGS. 2a, 2b and 2c is capable of generating four different types of measuring light to produce a recordable interference pattern at each of four different rotational positions of the non-rotationally symmetric surface 3 about an axis of rotation 10.

The grating 25 generating the four different types of measuring light can be designed and manufactured as follows:

When the target shape of the non-rotationally symmetric surface 3 is known, a suitable axis of rotation 10 has to be determined. It is possible for example to determine a mathematical rotationally symmetric shape which best approximates the non-rotationally symmetric target shape, and the axis of rotational symmetry of such best approximating surface can be used as the axis of rotation for optical element 5. When the axis of rotation is determined relative to the target shape of optical surface 3, it is necessary to determine the relative position and orientation of axis 10 relative to grating 25. Thereafter, first, second, third and fourth rotational positions of optical element 5 about the axis of rotation 10 have to be determined. Thereafter, it is possible to determine first, second, third and fourth phase functions of the grating such that measuring light diffracted at the grating according to the respective phase function is orthogonally incident on the surface 3 at the corresponding rotational position. Thereafter, an arrangement pattern of segments 51 and regions 53 of the grating have to be determined, and grating forming structures in the various regions 53 can be determined according to the four different phase functions, wherein the grating forming structures in the regions 53$_1$ are determined according to the first phase function, the grating forming structures in regions 53$_2$ are determined according to the second phase function and so on. When the four phase functions and the arrangement pattern of regions 53 are known, the corresponding grating forming structures can be manufactured by methods which are, per se, well-known in the art.

FIGS. 3a, 3b and 3c illustrate a further possible arrangement of a grating 25 incorporating four different phase functions. Regions 53$_1$, 53$_2$, 53$_3$ and 53$_4$ of the grating 25, each incorporating one single phase function, are arranged as elongated parallel stripes (FIGS. 3b and 3c) rather than a rectangular area pattern as in the embodiment illustrated with reference to FIGS. 2a, 2b and 2c.

Figure 4A:
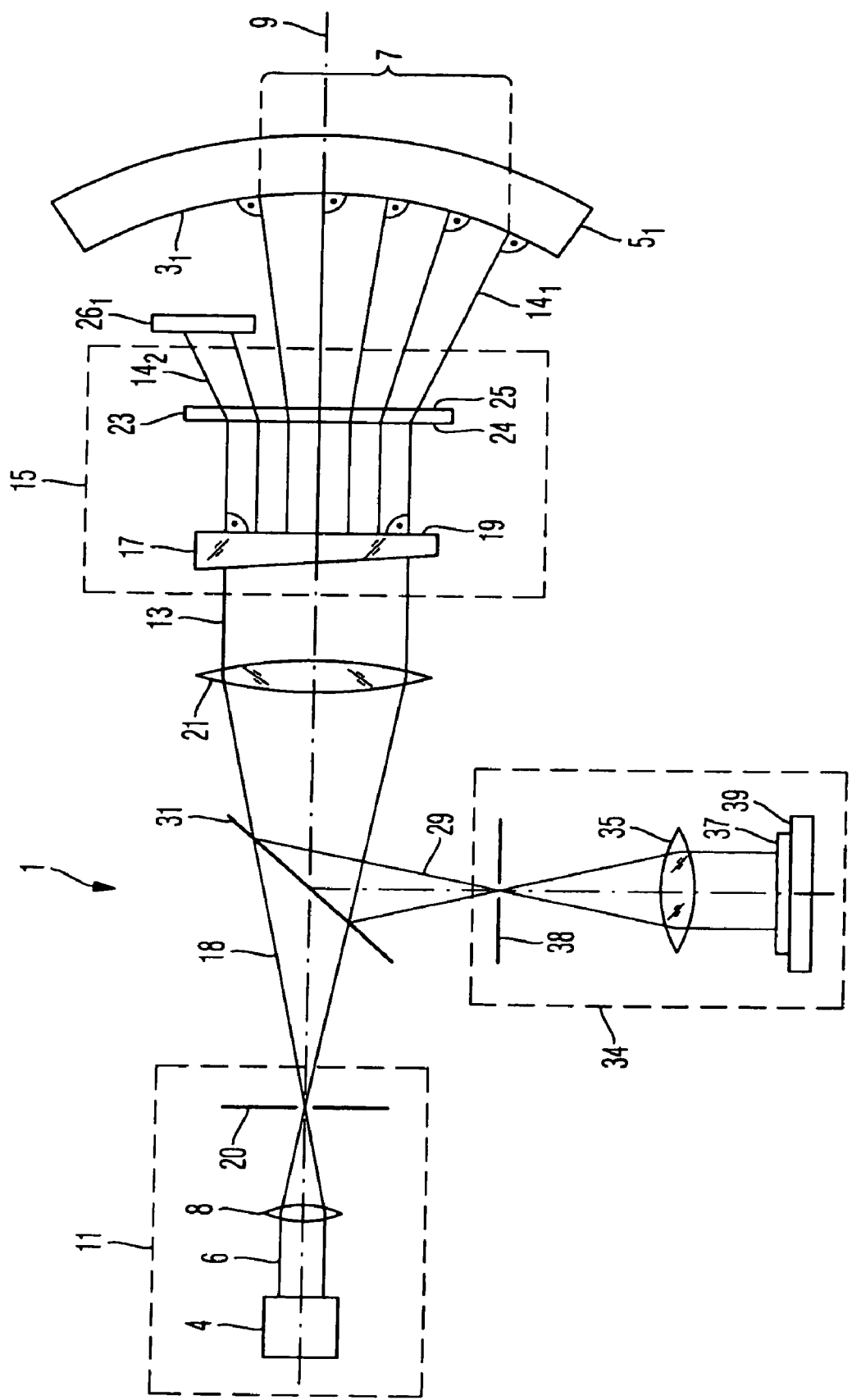
FIGS. 4a and 4b schematically illustrate an interferometer arrangement for testing an optical element according to a further embodiment of the present invention.
Figure 4B:
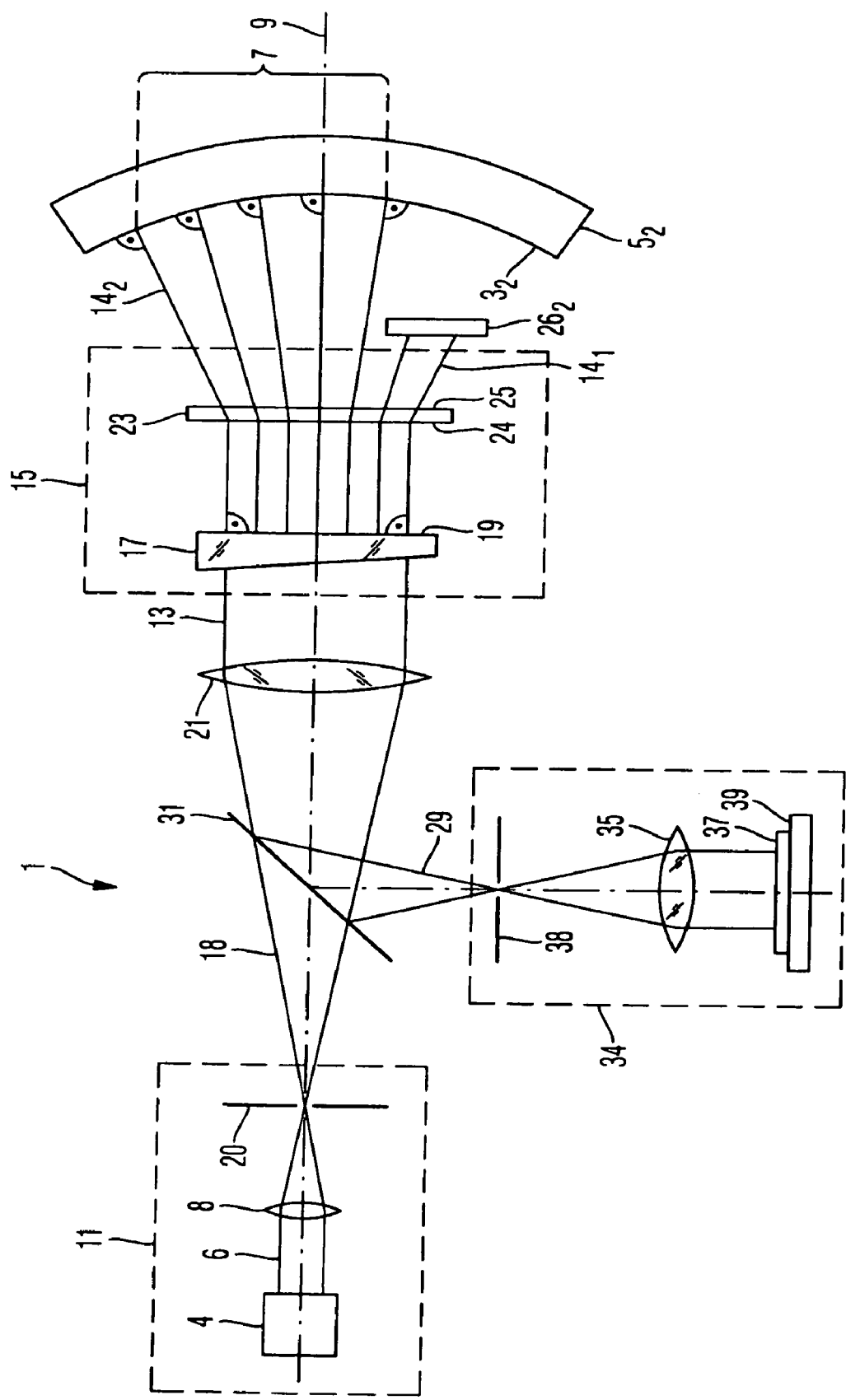

FIGS. 4a and 4b illustrate a further embodiment of an interferometric method where two different optical elements 5$_1$ and 5$_2$ having optical surfaces 3$_1$ and 3$_2$, respectively, of different target shapes can be measured with a same interferometer apparatus 1.

Figure 5:
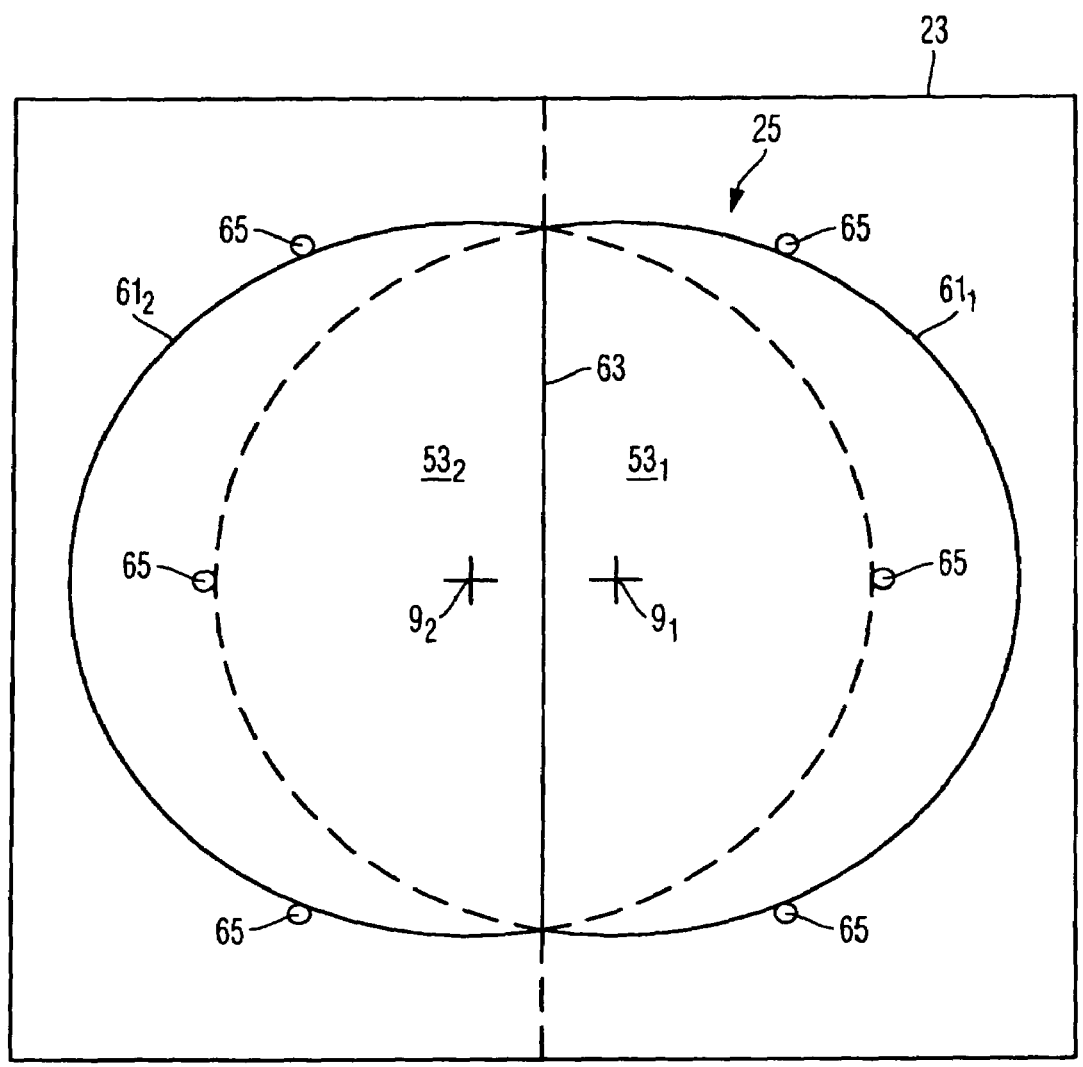
FIG. 5 is a schematic representation of a grating structure incorporated in an interferometer optics of the interferometer arrangement shown in FIGS. 2a and 2b.

The target shapes 3$_1$ and 3$_2$ differ from one another by an amount which makes it impossible to measure both surfaces with an interferometer optics having a grating incorporating one single phase function. Therefore, a grating 25 used for testing the two different surfaces 3$_1$ and 3$_2$ incorporates two different phase functions. FIG. 5 illustrates an arrangement of two different regions 53$_1$ and 53$_2$ of the grating 25 on substrate 23. The first region 53$_1$ is defined by a portion of a circle 61$_1$ indicated by a continuous line in FIG. 5 and a straight line 63. This region 53$_1$ generates the measuring light 14$_1$ used for measuring the first optical element 5$_1$ as shown in FIG. 4a.

The second region 53$_2$ is defined by a portion of a circle 61$_2$ shown as a continuous line in FIG. 5 and by straight line 63. Region 53$_2$ of grating 25 generates the measuring light 14$_2$ used for testing the optical surface 3$_2$ as shown in FIG. 4b. Since each of regions 53$_1$ and 53$_2$ occupies only a portion of the total surface of grating 25, only a portion (represented by reference numeral 7 in FIGS. 4a and 4b) of the optical surfaces 3$_1$ and 3$_2$, respectively, can be tested at a same time.

Referring to FIG. 4a, the measuring light 14$_1$ generated by diffracting the incident light beam 13 at region 53$_1$ of grating 25 is incident on portion 7 of surface 3$_1$. The other measuring light $14_2$ generated by diffracting the incident light beam 13 at region $53_2$ of grating 25 is intercepted by a plate $26_1$ disposed in the beam path of measuring light $14_2$ such that this undesired measuring light is not incident on surface $3_1$ and will not contribute to the interference pattern formed on the detector. In other embodiments, plate $26_1$ is not used for intercepting the undesired measuring light since such undesired measuring light is not orthogonally incident on the optical surface to be tested and will, therefore, not be reflected from the optical surface such that it is able to traverse aperture 38 to contribute to the interference pattern formed on the detector 39.

With such arrangement it is not possible to measure the complete surface $3_1$ at a same time. However, it is possible to arrange the optical element $5_1$ at plural rotational positions about an axis of rotation 9 and to perform an interferometric measurement at each of the rotational positions, wherein at each measurement, a different portion 7 of the optical surface is measured, and the plural measurements can be combined such that, finally, substantially the whole total surface of optical element 5 has been measured. Such combination of individual interferometric measurements is referred to as stitching interferometry in the art. Further details of stitching interferometry can be taken from WO 2005/114101, the entire contents of which are incorporated herein by reference.

It is apparent from FIGS. 4a and 4b that the tested portions 7 of the optical surface on which the desired measuring light is incident always includes the axis of rotation 9. Therefore, a region about the axis of rotation 9 forms an overlapping portion which is measured in each of the plural measurements performed at the respective rotational positions of the optical element. Such overlapping portion is advantageous for performing the calculation of the total optical surface to be tested by stitching interferometry. To achieve that the region about the axis of rotation 9 is illuminated in the measurements for both optical elements $5_1$ and $5_2$, it is necessary to maintain the substrate 23 carrying the hologram 25 at two different positions relative to the other components of the interferometer arrangement 1 in the two different measuring setups as shown in FIGS. 4a and 4b. Referring to FIG. 5, a cross $9_1$ indicates a position where the axis of rotation 9 shown in FIG. 4a intersects the grating 25 when the first optical element $5_1$ is to be tested. Similarly, a cross $9_2$ indicates a position where the axis of rotation 9 shown in FIG. 4b intersects the grating 25 when the optical element $5_2$ is to be tested. It is therefore necessary to displace the substrate 23 carrying the grating 25 between measurements of the different optical elements. A reproducible displacement of the substrate 23 is achieved by mounting the substrate 23 on a mounting structure 67 via half-spheres 65 fixed by an adhesive to the surface of substrate 23, wherein the half-spheres 65 engage v-shaped grooves 69 provided on the mounting structure 67. Three grooves 69 are provided on the mounting structure 67, whereas six different half-spheres are fixed to the surface of substrate 23 at suitably chosen locations such that, when three of the six spheres 65 engage with the respective grooves 69, location $9_1$ coincides with the axis of rotation 9 when the first optical element $5_1$ is to be tested, and such that three other half-spheres 65 engage with the respective grooves to position the substrate 23 such that position $9_2$ coincides with the axis of rotation 9 when the other optical element $5_2$ is to be tested.

Figure 6:
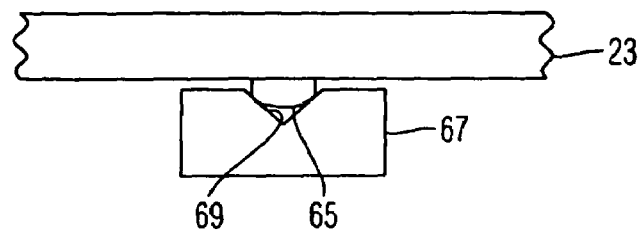
FIG. 6 is a sectional view illustrating a mounting structure for a grating shown in FIG. 5.
Figure 7:
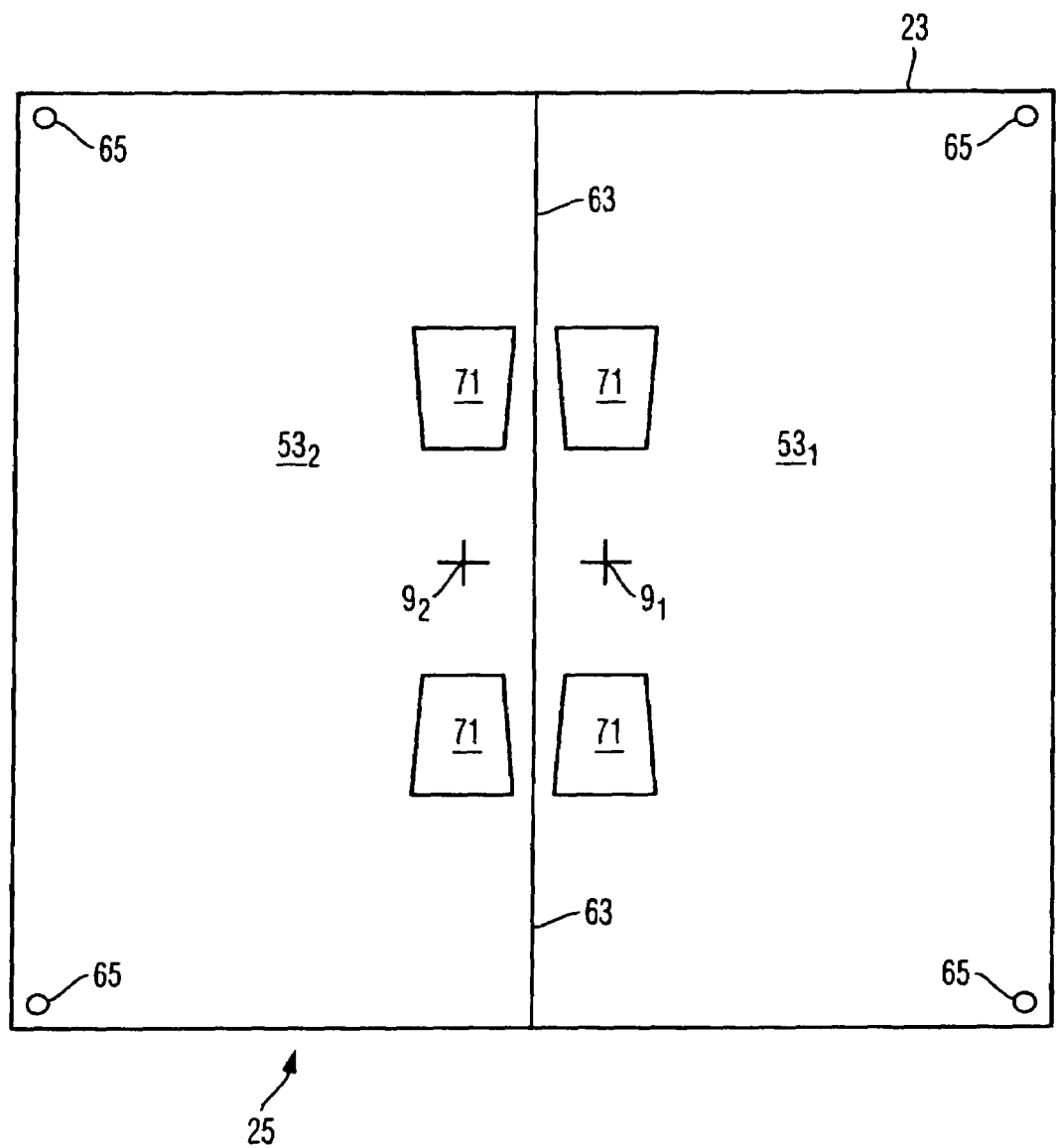
FIG. 7 is a schematic representation of a further grating structure which can be incorporated in the interferometer optics shown in FIGS. 2a and 2b.
Figure 8:
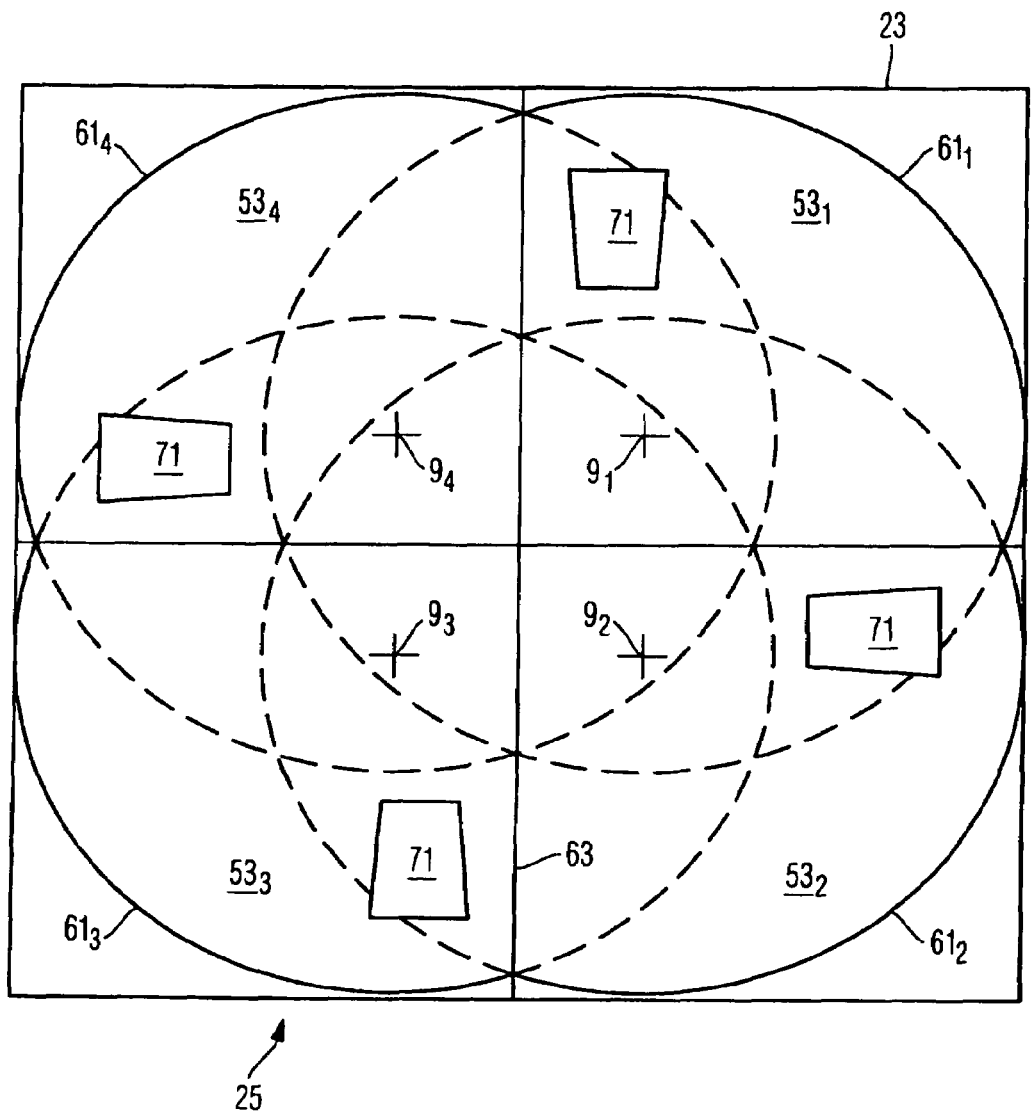
FIG. 8 is a schematic representation of a further grating structure which can be incorporated in the interferometer optics shown in FIGS. 2a and 2b.
Figure 9:
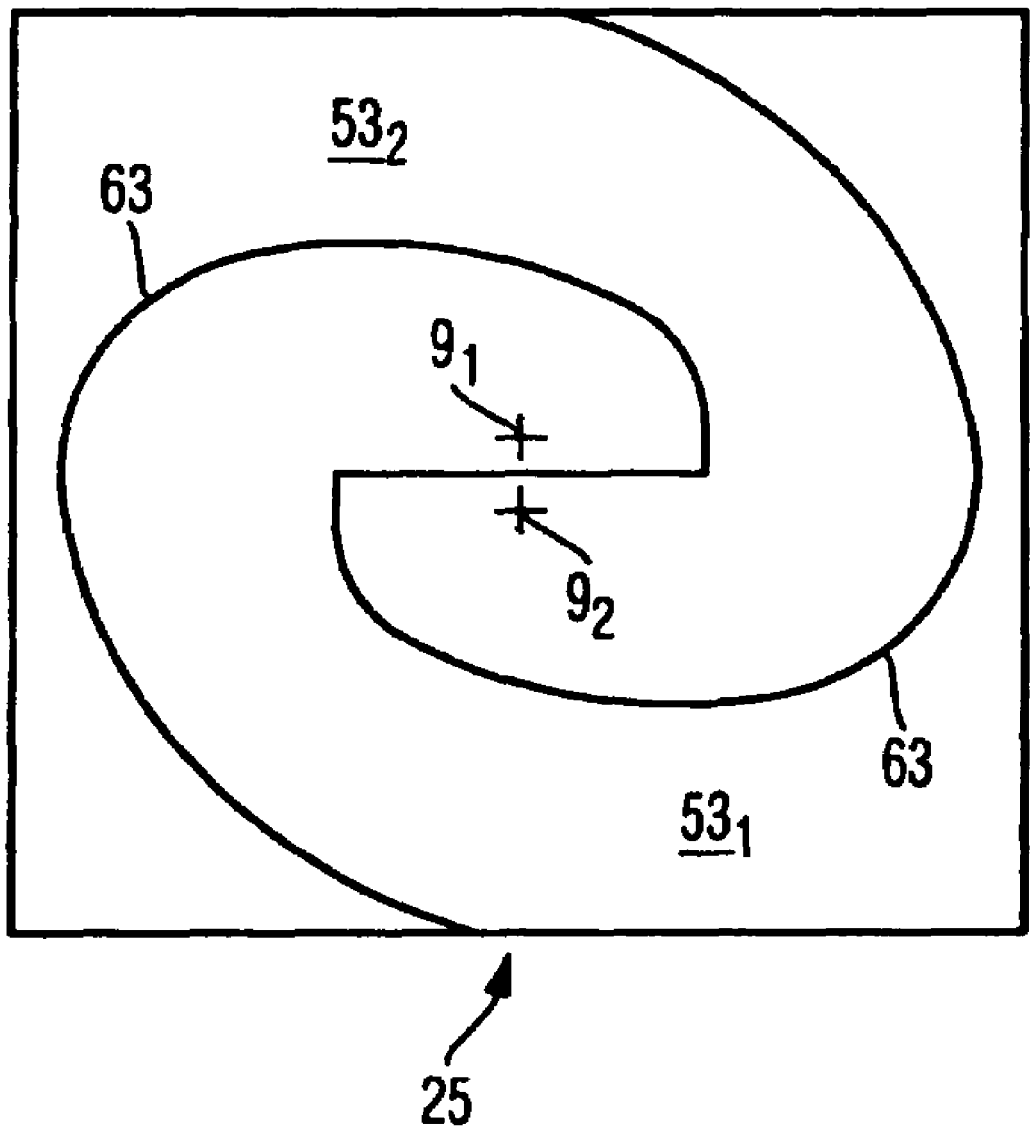
FIG. 9 is a schematic representation of a still further grating structure which can be incorporated in the interferometer optics shown in FIGS. 2a and 2b.

FIGS. 7, 8 and 9 illustrate further embodiments of a grating 25 which can be used for testing plural different optical surfaces as illustrated above with reference to FIGS. 4, 5 and 6, wherein same reference numerals are used in FIG. 6 to represent components which have a same or similar function as components illustrated with reference to FIGS. 4, 5 and 6.

The grating 25 shown in FIG. 7 is configured to produce two different types of measuring light according to different phase functions incorporated in regions $53_1$ and $53_2$ of the grating 25. The grating shown in FIG. 7 further comprises additional regions 71 provided for generating measuring light which can be used for adjustment purposes. More detailed information relating to grating regions diffracting light for improving an adjustment of an interferometer apparatus can be taken from U.S. patent application No. 11/233,435, the entire contents of which are incorporated herein by reference.

FIG. 8 illustrates a further embodiment of the grating 25 which is capable of producing four different types of measuring light for testing four different optical surfaces with a same interferometer apparatus as illustrated above with reference to FIGS. 1 to 6. In FIG. 7, four different regions $53_1$, $53_2$ $53_3$ and $53_4$ of a grating 25 are arranged as four rectangular sectors on a surface of a substrate 23, wherein the four sectors are separated by straight lines 63.

FIG. 9 illustrates an arrangement of two regions $53_1$ and $53_2$ of a grating, wherein the regions $53_1$ and $53_2$ are separated by a spiral shaped line 63. Each of the regions $53_1$ and $53_2$ is configured to generate one type of measuring light for testing a corresponding optical surface, wherein an axis of rotation of the surface intersects the corresponding region $53_1$, $53_2$ at a position $9_1$ and $9_2$, respectively.

The lateral extensions of the segments 51 are configured such that an image of the segment 51 on the surface 37 of detector 39 has a lateral extension less than a lateral extension of a pixel of the detector 39. Therefore, each pixel of the detector receives light from one or more segments 51 of the grating in each measurement position of the optical element 5 about axis of rotation 10. In the illustrated example, the lateral extension of the segments 51 may be in a range from 100 µm to 200 µm, wherein a total diameter of the grating 25 used for testing is about 210 nm, and a number of pixels of the detector is 1000×1000.

Gratings or holograms illustrated in the above embodiments provide two or more different functions in that they are adapted to diffract measuring light such that different portions of the diffracted light have different wavefronts. This is achieved by providing different types of regions in the grating, wherein the grating in each region is configured such that it provides one single function and, for a specified diffraction order, one type of wavefront for the diffracted light. It is, however, possible to design a grating such that it provides two or more functions within one single region. Such types of gratings are referred to as having a complex encoding in the art. It is contemplated within the present invention to use such complex encoded gratings for providing a grating with two different functions in situations where the embodiments illustrated above use gratings having different regions of more than one type.

Summarized, embodiments of the present invention comprise a method of testing and manufacturing optical elements comprising generating measuring light in an interferometer apparatus, wherein the interferometer apparatus comprises a grating providing two or more phase functions. This allows for testing surfaces which are not rotationally symmetric and two or more rotational positions and for testing two or more different surfaces with a same grating.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A method of manufacturing an optical element having an optical surface of a non-rotationally symmetric shape, the method comprising:

generating measuring light using an interferometer optics, wherein the interferometer optics comprises at least one diffractive component having a grating, positioning the optical surface at a first position relative to the at least one diffractive component, wherein first measuring light diffracted at the diffractive component is incident on the optical surface at plural locations thereof, and detecting at least one first interference pattern generated from first measuring light reflected from the optical surface;

positioning the optical surface at a second position relative to the at least one diffractive component, wherein second measuring light diffracted at the diffractive component is incident on the optical surface at plural locations thereof, and detecting at least one second interference pattern generated from second measuring light reflected from the optical surface, wherein the grating provides at least a first phase function and a second phase function.

2. The method according to claim 1, wherein the first measuring light is diffracted at the diffractive component according to the first phase function and the second measuring light is diffracted at the diffractive component according to the second phase function.

3. The method according to claim 1, wherein the grating comprises a plurality of regions of at least first and second types, wherein the regions of the first type include grating portions providing the first phase function and wherein the regions of the second type include grating portions providing the second phase function.

4. The method according to claim 3, wherein the regions of the at least first and second types are alternatingly distributed across a surface of the grating.

5. The method according to claim 3, wherein the regions of the at least first and second types are arranged according to a regular pattern.

6. The method according to claim 3, wherein the regions of the at least first and second types are arranged according to an irregular pattern.

7. The method according to claim 1, wherein the first and second interference patterns are detected by a detector including an array of pixels, wherein a surface of the grating is imaged onto the array of pixels, and wherein the regions of the grating are arranged such that lateral extensions of images of the regions formed on the array of pixels are smaller than lateral extensions of individual pixels of the detector.

8. The method according to claim 7, wherein the regions of the grating are arranged such that the lateral extensions of the images of the regions formed on the array of pixels are two or more times smaller than the lateral extensions of the individual pixels.

9. The method according to claim 1, further comprising processing of the optical surface based on the detected interference patterns.

10. The method according to claim 9, wherein the processing of the optical surface of the optical element comprises at least one of milling, grinding, loose abrasive grinding, polishing, ion beam figuring, magneto-rheological figuring, reactive ion beam etching, and finishing the optical surface of the optical element.

11. The method according to claim 10, wherein the finishing comprises applying a coating to the optical surface.

12. The method according to claim 11, wherein the coating comprises at least one of a reflective coating, an anti-reflective coating and a protective coating.

* * * * *